T. P. LONG.
VALVE.
APPLICATION FILED AUG. 20, 1909.

962,368.

Patented June 21, 1910.

WITNESSES
William P. Goebel.
E. F. Murdock

INVENTOR
Thomas P. Long
BY
ATTORNEYS

UNITED STATES PATENT OFFICE.

THOMAS PITTINGER LONG, OF BARBERTON, OHIO, ASSIGNOR OF ONE-HALF TO WILLARD M. HUFFMAN, OF BARBERTON, OHIO.

VALVE.

962,368.

Specification of Letters Patent. Patented June 21, 1910.

Application filed August 20, 1909. Serial No. 513,827.

*To all whom it may concern:*

Be it known that I, THOMAS P. LONG, a citizen of the United States, and a resident of Barberton, in the county of Summit and State of Ohio, have invented a new and Improved Valve, of which the following is a full, clear, and exact description.

Among the principal objects which the present invention has in view are: to provide a mechanism for rapidly opening and closing valves in the employment of which the lateral strain upon the valve stem is minimized; and to provide a mechanism for rapidly opening and closing valves which is simple, durable and efficient.

One embodiment of the present invention is disclosed in the structure illustrated in the accompanying drawings, in which like characters of reference denote corresponding parts in both the views, and in which—

Figure 1:
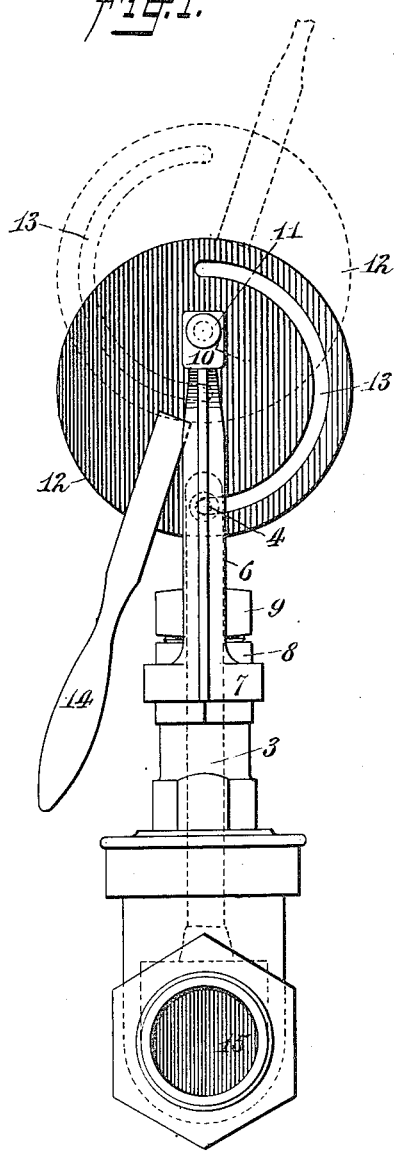
Figure 2:
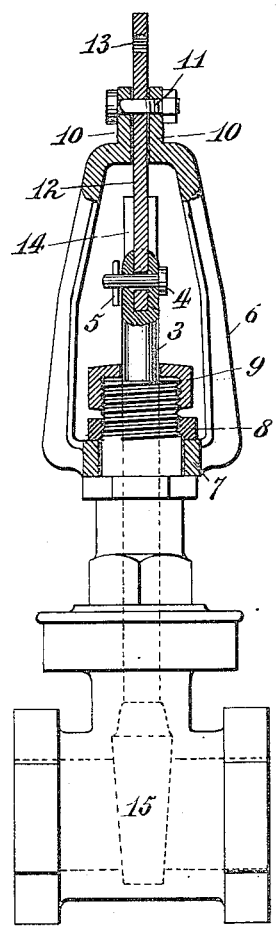

Figure 1 is a side elevation of the device shown in its application to an ordinary gate valve; and Fig. 2 is a vertical section of the eccentric wheel and yoke upon which the same is mounted.

The present construction may be applied to all of the usual forms of valves, being equally applicable to all straight lifting valves and advantageous in that the power applied for lifting or depressing the valves is not only equally applied but applied with increased power.

The valve stem 3 is bifurcated at the upper end by forming a slot therein, using any suitable means therefor. Extended from suitable perforations formed in the bifurcated ends is a pin 4. The pin 4 is held in place after being extended through the bifurcated ends of the stem 3 by means of a cotter 5.

A yoke 6 is provided with a ring-like body portion 7 which fits the bonnet of the valve snugly and is held in position thereon by means of a jam nut 8. Threadably mounted upon the screw threaded extension of the bonnet is a cap nut 9, through a perforation in the center whereof the stem 3 is passed. The open construction of the yoke 6 permits the rapid manipulation of the nuts 8 and 9 when seating the same to hold the yoke in position. The upper end of the yoke is parted to form vertical extensions 10, 10 through a perforation in which is passed a screw threaded pivot bolt 11. The bolt 11 is provided with a screw threaded end held in threaded engagement with a screw nut, while the other extension is smooth bored and adapted to receive the impingement of the head of the bolt 11.

The bolt 11 has pivotally mounted thereon a disk 12 the rotary center whereof is eccentric to the circumference of the disk, as shown particularly in Fig. 1 of the drawings. Concentric with the circumference of the said disk is a semi-circular slot 13 formed in the said disk to receive the pin 4 which is passed through the sides of the upper end of the valve stem 3. The disk 12 has fixedly mounted thereon and preferably extended in line with the rotary center of the said disk, a handle 14.

In mounting the yoke 6, the disk 12 and parts connected therewith, upon a valve— the stem 3 whereof is bifurcated or slotted and provided with the pin 4—the disk 12 is placed in position after the yoke 6 has been firmly seated upon the valve. In placing the disk 12 in position it is first extended through the vertical extensions 10, 10 and into the slot formed in the upper end of the stem 3, when the pin 4 is extended through the perforations provided in the end of the stem 3 and through the slot 13 formed in the disk 12. The perforation in the disk 12 upon which the said disk is to be rotated is then alined with the perforations formed in the vertical extensions 10, 10 and the pivot bolt 11 is extended through the said perforations being threadably engaged in one of the said extensions 10, 10. When the bolt 11 is snugly set up to the extension 10 the device is in position to be operated.

The perforation upon which the disk 12 is rotated is, by preference, disposed substantially in line with the ends of the slot 13. It is placed so that the ends of the slot are unequally distant from the said perforation, whereby the pin 4, when contained in the said slot, is drawn to or forced from the bolt 11 by the rotation of the disk 12 upon the said bolt 11. The distance between the disposition of the one end of the slot from the bolt 11 when in line between the stem 3 and the bolt 11 and the distance between the other end of the slot and the bolt 11, equals the extent of the action of the stem 3 and valve connected therewith.

In its operation it is provided that the handle 14 should be held in the depressed position shown in Fig. 1 of the drawings when the valve 15 is closed. To fully open the valve the handle 14 is raised to the position shown in dotted lines in Fig. 1 of the drawings. In this action on the part of the handle 14 the disk 12 and pin 4 on the stem 3 has traveled vertically in a line coincident with the extensions of the yoke 6, the pin 4 sliding freely in the slot 13. At any point intermediate the fully closed or open position of the valve 15 the handle may be arrested and held by upsetting the bolt 11 to bring the extensions 10, 10 in holding contact with the disk 12. Further, when the said valve is by this device placed in full open or closed position it may be there held by upsetting or tightening the said bolt 11, insuring the position of the valve against vibration or accident.

Having thus described my invention, what I claim as new and desire to secure by Letters Patent is:—

1. A valve comprising a supporting frame formed upon the bonnet of the said valve; a cam-like member rotatably mounted upon said frame; means connecting the stem of said valve to the cam surface of said member to reciprocate said valve stem; and means for rotating said member.

2. A valve, comprising a yoke-like attachment adapted to fit upon the bonnet of the said valve; a cam-like member rotatably mounted upon said attachment; means for connecting the stem of the said valve to the cam surface of said member; and means for rotating said member.

3. A valve, comprising a yoke-like attachment adapted to fit upon the bonnet of the said valve; a disk rotatably mounted on said attachment; a cam slot formed in said disk; means for connecting the stem of said valve with said slot to slide therein; and means for rotating the said disk.

4. A valve, comprising a yoke-like attachment adapted to fit upon the bonnet of the said valve; a disk rotatably mounted between the ends of said attachment; a slot formed in said disk eccentric to the rotary center thereof; means for connecting the stem of said valve with said slot to slide therein; and means for rotating the said disk.

5. A valve, comprising a yoke-like attachment adapted to fit upon the bonnet of the said valve; a disk mounted between the ends of said attachment eccentric to the structural center of said disk; a slot formed in said disk concentric with the structural center of said disk; means for connecting the stem of said valve with said slot to slide therein; and means for rotating the said disk.

6. A valve, comprising a yoke-like attachment adapted to fit upon the bonnet of the said valve; a disk rotatably mounted between the ends of said attachment; a slot formed in said disk eccentric to the rotary center thereof; means for connecting the stem of said valve with said slot to slide therein; means for rotating the said disk; and means for locking the said disk immovably on said attachment.

7. A valve, comprising a yoke-like attachment adapted to fit upon the bonnet of the said valve; a disk mounted between the ends of said attachment eccentric to the structural center of said disk; a slot formed in said disk concentric with the structural center of said disk; means for connecting the stem of said valve with said slot to slide therein; means for rotating the said disk; and means for locking the said disk immovably on said attachment.

In testimony whereof I have signed my name to this specification in the presence of two subscribing witnesses.

THOMAS PITTINGER LONG.

Witnesses:
FRED JAY SHOOK,
GEORGE W. KEEFER.